(12) United States Patent
Johnson

(10) Patent No.: US 9,190,816 B2
(45) Date of Patent: Nov. 17, 2015

(54) CABLE MANAGER

(75) Inventor: John Johnson, Duluth, GA (US)

(73) Assignee: NCR Corporation, Duluth, GA (US)

(*) Notice: Subject to any disclaimer, the term of this patent is extended or adjusted under 35 U.S.C. 154(b) by 51 days.

(21) Appl. No.: 13/194,316

(22) Filed: Jul. 29, 2011

(65) Prior Publication Data
US 2013/0026307 A1 Jan. 31, 2013

(51) Int. Cl.
F16L 3/10 (2006.01)
H02G 3/04 (2006.01)

(52) U.S. Cl.
CPC ............ *H02G 3/0468* (2013.01); *F16L 3/1091* (2013.01)

(58) Field of Classification Search
USPC ............ 248/247, 248, 300, 49, 65, 68.1; 174/481, 503, 68.1, 135; 439/713, 887, 439/501, 942; 29/243.5, 281.1
See application file for complete search history.

(56) References Cited

U.S. PATENT DOCUMENTS

| | | | | |
|---|---|---|---|---|
| 2,799,841 A * | 7/1957 | Macy | ............................ | 439/423 |
| 2,885,654 A * | 5/1959 | Norden | .......................... | 439/814 |
| 2,982,808 A * | 5/1961 | Schwester | ................... | 174/84 C |
| 3,404,368 A * | 10/1968 | Roberts et al. | ................ | 439/866 |
| 3,638,172 A * | 1/1972 | Adam | ............................ | 439/791 |
| 4,545,640 A * | 10/1985 | Buchberger | .................. | 439/811 |
| 4,692,122 A * | 9/1987 | Montalbano | .................. | 439/882 |
| 4,789,357 A * | 12/1988 | Yamaguchi et al. | ...... | 439/607.01 |
| 5,427,552 A * | 6/1995 | Zielinski et al. | ............. | 439/845 |
| 2007/0264873 A1* | 11/2007 | Kakuta | ......................... | 439/585 |
| 2008/0085625 A1* | 4/2008 | Saha et al. | ..................... | 439/402 |

FOREIGN PATENT DOCUMENTS

JP  2003056763 A * 2/2003 ............. F16L 11/12

* cited by examiner

Primary Examiner — Alfred J Wujciak
(74) Attorney, Agent, or Firm — Paul W. Martin; Joseph P. Mehrle

(57) ABSTRACT

A cable manager which secures cables and constrains their movement in a controlled fashion. An example cable manager includes a flexible sheet. The flexible sheet includes a support section for supporting a cable along a portion of a length of the cable, the support section including a first end and a second end. A first cable retainer section wider than the support section is adjacent the first end, the first cable retainer section including first retainer sides which interlock. A second cable retainer section wider than the support section is adjacent the second end, the second cable retainer section including second retainer sides which interlock, and the second cable retainer section being separate from the first cable retainer section.

19 Claims, 7 Drawing Sheets

CABLE MANAGER

BACKGROUND

Providing adequate cable management between moving parts can prove to be costly and difficult. Example moving parts may include currency cassettes and other devices mounted on telescoping rails that must be racked in and out for servicing. Cables may be damaged if they are not managed well. Cable damage has a negative impact on device reliability and may also have a negative impact on safety. Damaged cables may create a fire hazard or produce unexpected device operation.

It would be desirable to provide an alternative cable management solution which addresses these issues.

SUMMARY

A cable manager is provided.

An example cable manager includes a flexible sheet. The flexible sheet includes a support section for supporting a cable along a portion of a length of the cable, the support section including a first end and a second end. A first cable retainer section wider than the support section is adjacent the first end, the first cable retainer section including first retainer sides which interlock. A second cable retainer section wider than the support section is adjacent the second end, the second cable retainer section including second retainer sides which interlock, and the second cable retainer section being separate from the first cable retainer section.

DETAILED DESCRIPTION

Figure 1:
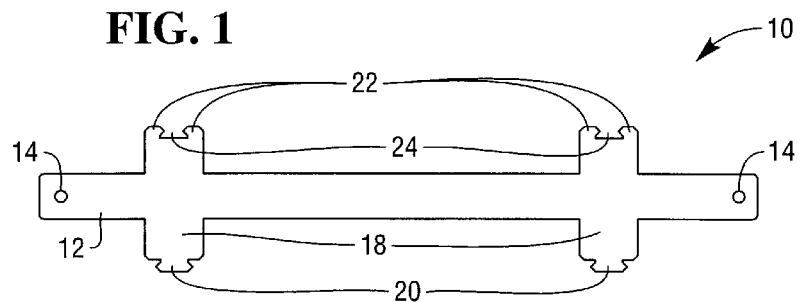
FIG. 1 is a plan view of an example embodiment of a cable manager.
Figure 2:
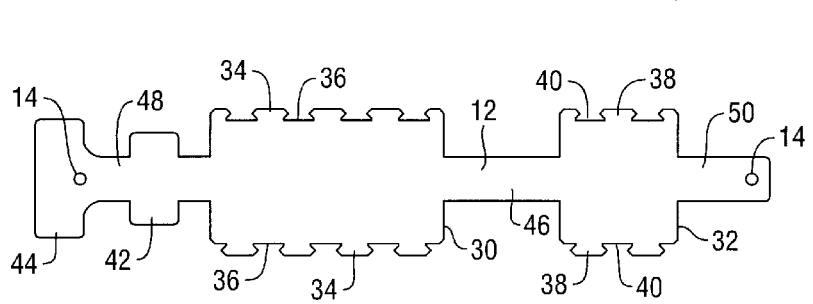
FIG. 2 is a plan view of another example embodiment of the cable manager.
Figure 3:
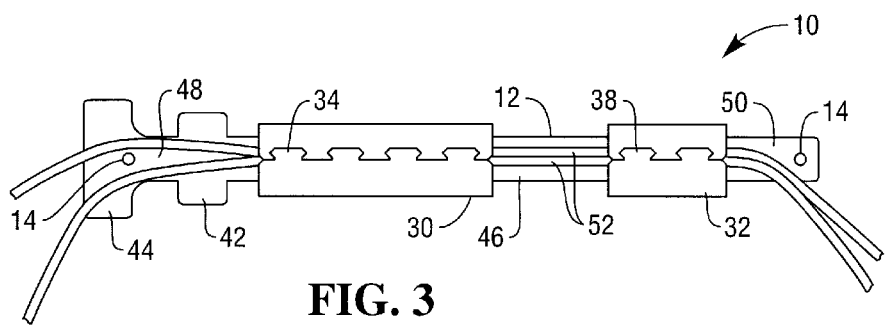
FIG. 3 illustrates an example cable manager wrapped around a set of cables.

Referring now to FIGS. 1-3, example embodiments of cable manager 10 are illustrated.

Cable manager 10 may be cut from a single sheet, to a length suitable for the length of the sections of cables 52 (FIG. 3) that must be managed and to a width suitable for the number and thickness of cables 52 to be managed. An example sheet may include flame retardant polypropylene. The material may be inexpensive. In some embodiments, the material may additionally provide strain relief. The material is preferably insulative, providing additional safety if electrical cables 52 are damaged. The cutting process may include die cutting, laser cutting, water-jet cutting, or other techniques. Cable manager 10 may remain in its flat, unfolded state until installation in order to reduce shipping costs and inventory storage volume.

Example cable manager 10 includes a flexible member 12 and cable retainers 18.

Flexible member 12 runs parallel to cables 52. Flexible member 12 allows cable manager 10 to assume various shapes and twists as cables 52 bend. Flexible member 12 may be mounted with ends points fastened in the same plane, or different planes. The flexible nature of flexible member 12 allows torsion which enables cable manager 12 to mount in out-of-plane locations.

Flexible member 12 may include one or more apertures 14 at opposite ends for anchoring cable manager 10 and the cable or cables retained by cable manager 10. Flexible member 12 may be anchored with screws or other fasteners.

Alternatively, cable manager 10 may require no attachment hardware. Sheet metal mounting locations may include bridge lance features. Cable manager 10 may be installed by slipping flared end 44 through a bridge lance feature, the ears of flared end 44 preventing end 44 from backing out.

Cable retainers 18 are oriented generally perpendicular to flexible member 12 and generally centered along flexible member 12. In other words, cable retainers 18 are cut to be wider than flexible member 12. Other geometries are also envisioned.

Cable retainers 18 include opposite sides which interlock, creating a loops around cables 52. In the example embodiments, cable retainers 18 include flaps 20 at one side and smaller retaining tabs 22 defining matching gaps 24 at the other side. Other retainer shapes and methods of fastening are also envisioned.

With reference to FIGS. 2-3, cable manager 10 may include larger retainers 18 of various lengths, such as retainers 30 and 32. Retainer 30 includes interlocking tabs 34 on both sides of retainer 30 which lock in gaps 36 between tabs 34 via hand-folding during installation. Retainer 32 includes interlocking tabs 38 on both sides of retainer 32 which lock in gaps 40 between tabs 38.

Retainers 30 and 32 create stiffened box sections which enclose and secure electrical cables 52 and constrain movement of electrical cables 52 in a controlled fashion. Electrical cables 52 may include data and/or power cables that may be connected at their respective ends using known means.

These stiff sections of cable manger 10 are adjacent flexible end sections 48 and 50 and are connected by flexible section 46, which allow cables 52 to bend between retainers 30 and 32. The alternating flexible and stiff sections of cable manager 10 allow cables 52 to control cable positioning as components move with respect to each other.

Cable manager 10 may further include additional enhancements. For example, cable manager 10 may include a larger, flared end to keep cable manager 10 securely fastened when subjected to repeated movement or extra tension.

As another example, cable manager 10 may include guard 42 for protecting cables 52 from device components, including moving device components.

Figure 4:
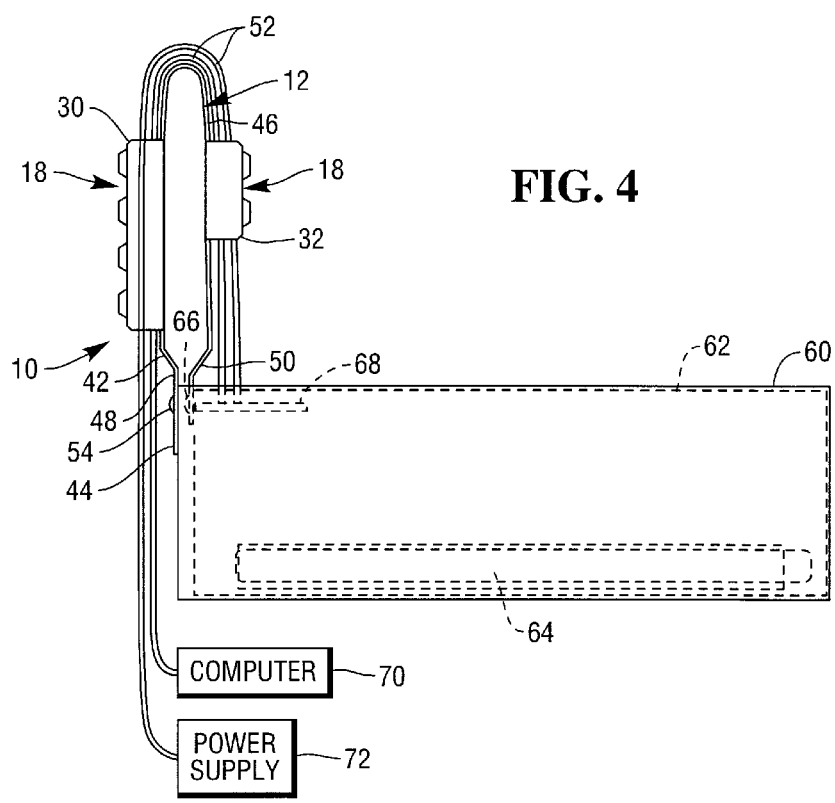
FIG. 4 is a view of an installed cable manager with a device component in a first position.
Figure 5:
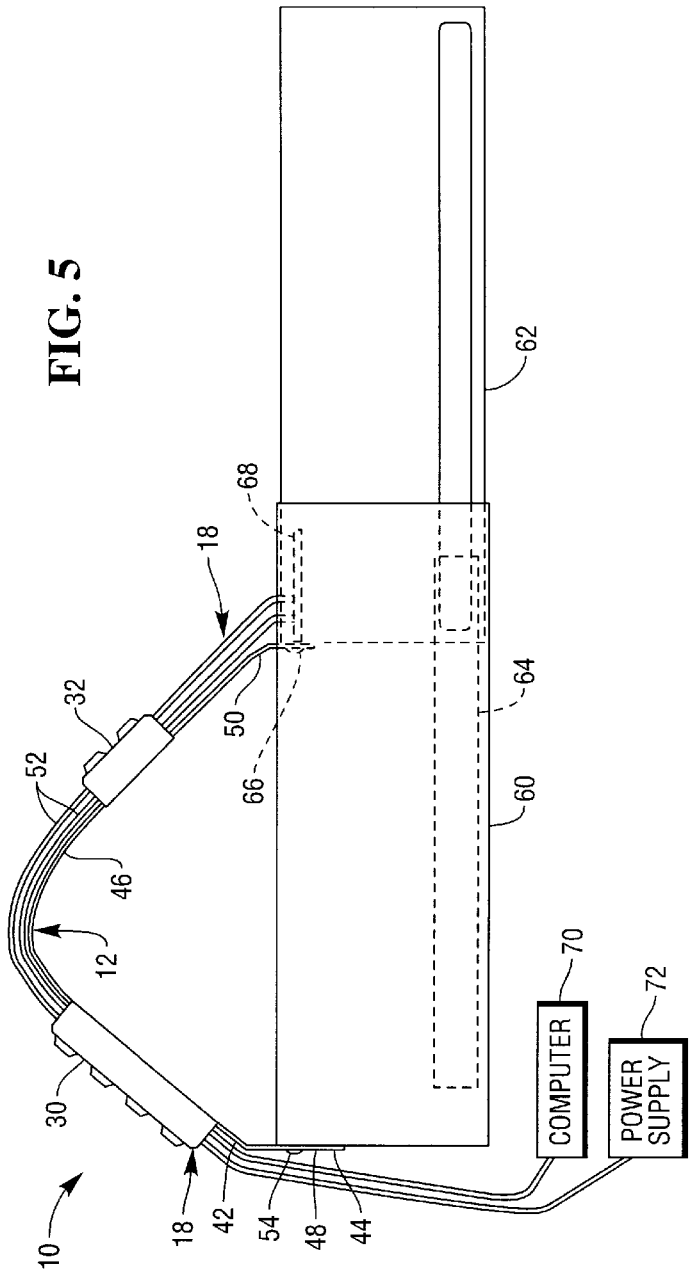
FIG. 5 is a view of the installed cable manager with the device component in a second position.

With reference to FIG. 4-5, an example installation of cable manager 10 is illustrated. The installation includes electrical connections to a component 60. Component 60 may include a peripheral of a computer system. Component 60 includes a drawer 62 mounted on rails 64 to allow drawer 62 to slide out for servicing.

Flared end 44 is fastened to a rear side of component 60 using a suitable fastener 54, such as a screw. The other end of cable manager 10 is fastened to a rear side of drawer 62, using a suitable fastener 66, such as a screw.

In one example installation, cables 52 may connect to computer 70 and power supply 72 at first ends. At second ends, the cables connect to printed circuit board 68 within drawer 62.

Flexible member 12 is oriented below cables 52 or inside the bend to support cables 52 from below.

FIG. 4 illustrates drawer 62 in an operational position. Cable manager 10 controls positioning of cables 52 so as to avoid, for example, cables 52 falling within component 60 behind drawer 62 or cables 52 contacting other components or other surfaces. Retainers 30 and 32 provide stiff support near flexible fastening sections 48 and 50. Flexible section 46 between retainers 30 and 32 allows cables 52 to bend sharply to accommodate the short distance between fastening points.

FIG. 5 illustrates drawer 62 in a service position. Retainers 30 and 32 continue to control positioning of cables 50. Flexible fastening sections 48 and 50 bend slightly to accommodate the longer distance between fastening points. Flexible section 46 also continues to bend, but less severely, in accordance with the longer distance between fastening points.

Figure 6:
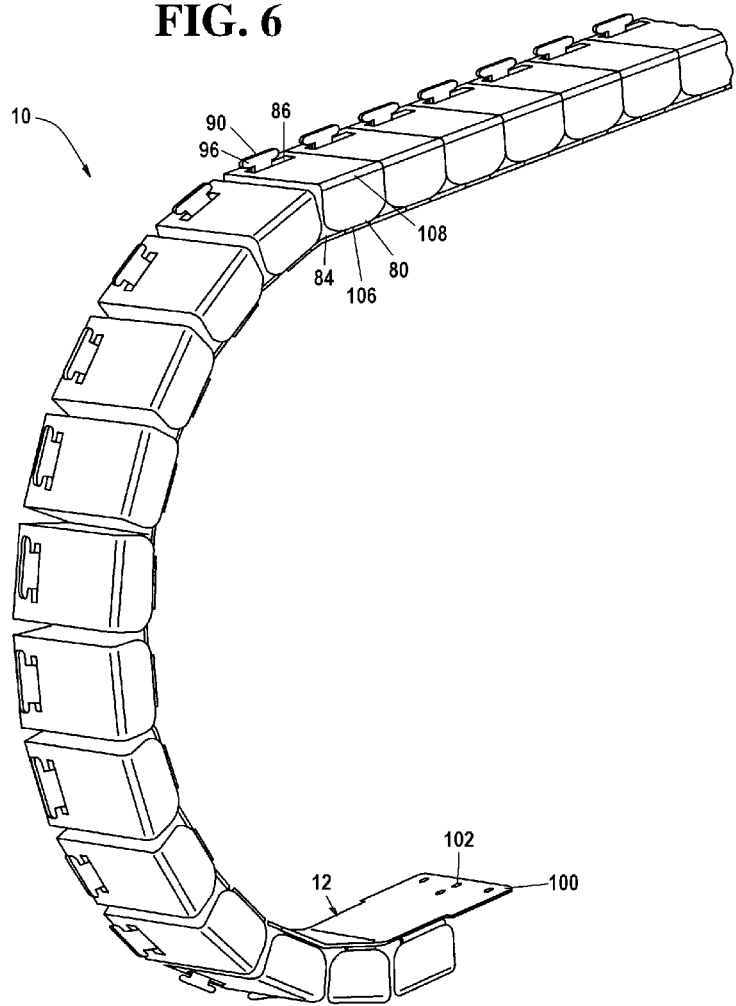
FIG. 6 is a view of another example cable manager with cable retainers installed.
Figure 7:
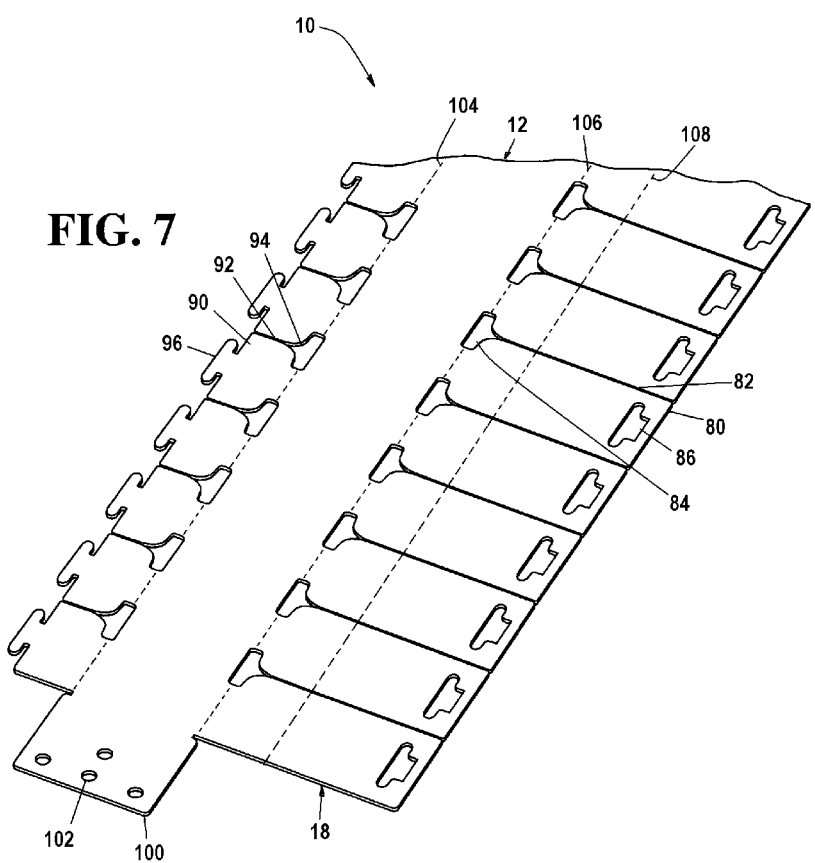
FIG. 7 is another view of the cable manager of FIG. 6.

FIGS. 6-9 illustrate alternative embodiments. With reference to FIGS. 6-7, adjacent cable retainers 18 include sections 80 and sections 90, with sections 80 being wider than sections 90.

Each section 80 includes an aperture 86. Aperture 86 may include a generally T-shaped aperture. Sections 80 are separated by cutting along lines 82.

Each section 90 includes a tab 96 arranged to lock with aperture 86. Tab 96 may include a generally T-shaped tab. Sections 90 are separated by cutting along lines 92.

Cable manager 10 further includes end 100 with apertures 102 for fasteners.

During installation, individual sections 80 are coupled to corresponding individual sections 90. Coupling may be made easier by establishing bend lines 104, 106, and 108.

The cable manager 10 of FIGS. 6-7 has more limited flexibility than the cable manager 10 of FIG. 3. Bending is generally limited so that flexible member 12 is located on the inside of the bend. Flexibility may be enhanced by providing additional cutouts, including apertures 84 and 94.

Figure 8:
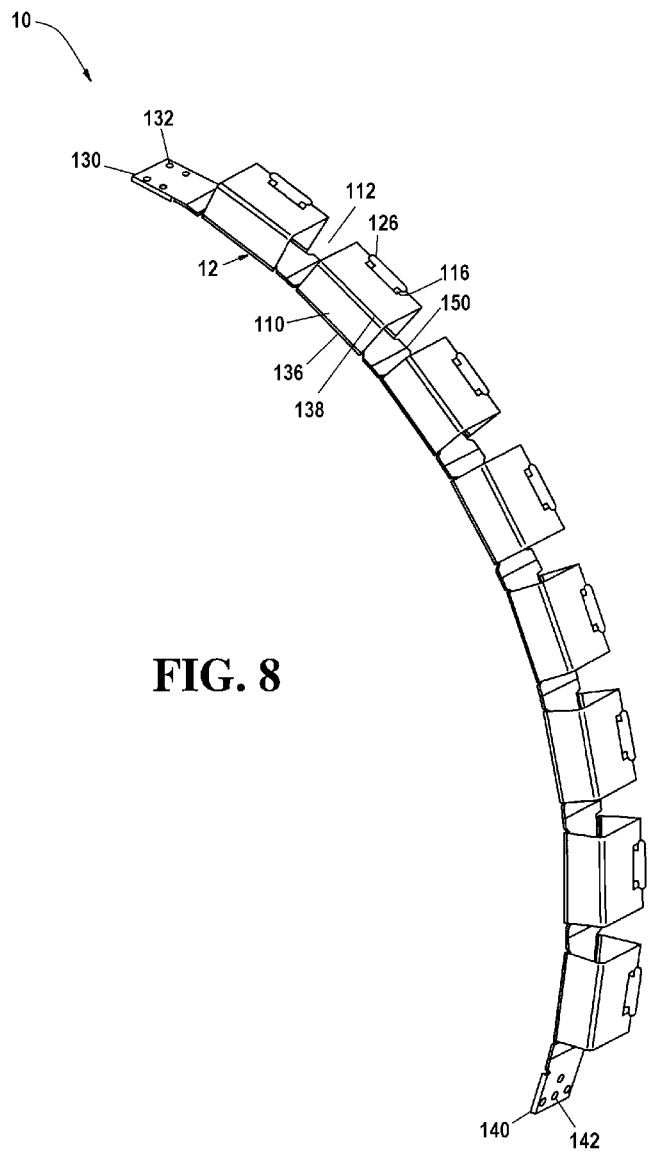
FIG. 8 is a view of another example cable manager with cable retainers installed.
Figure 9:
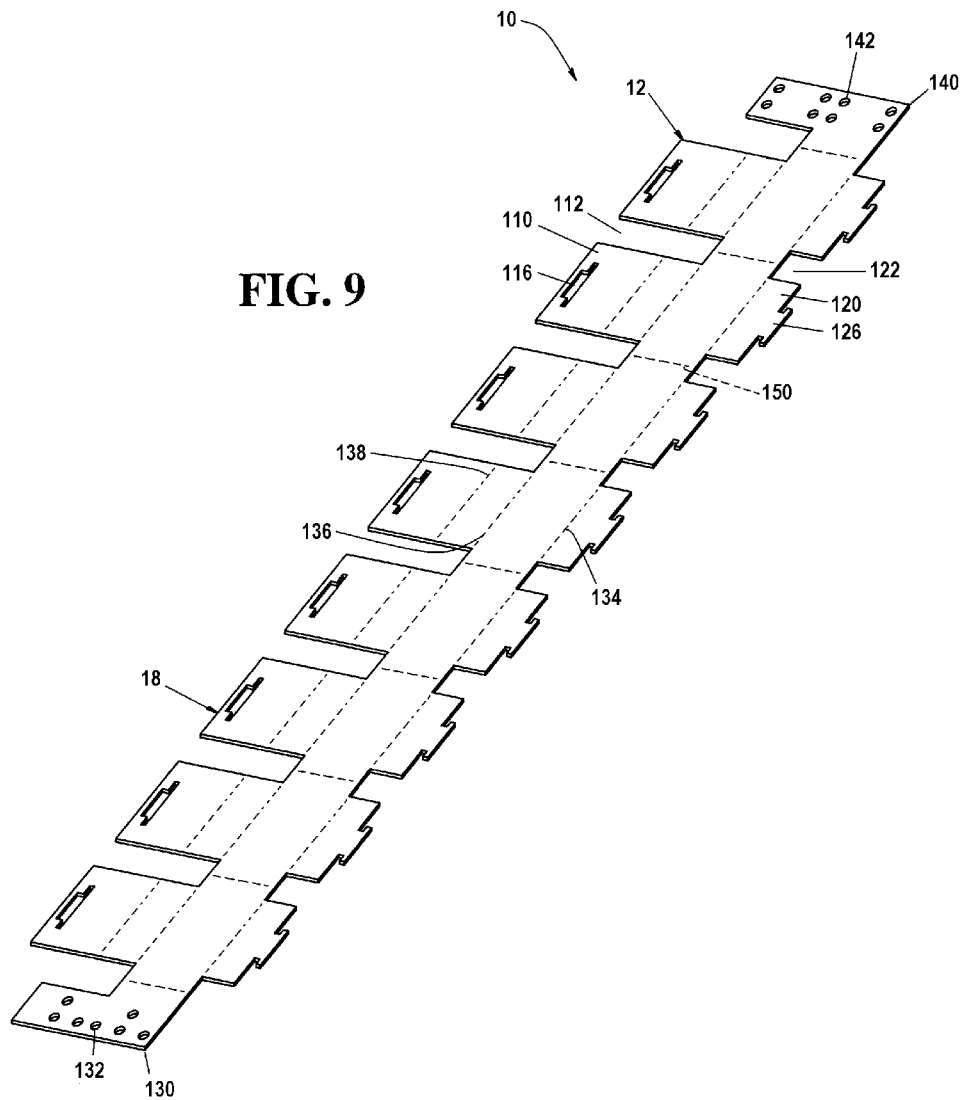
FIG. 9 is another view of the cable manager of FIG. 8.

With reference to FIGS. 8-9, adjacent cable retainers 18 include sections 110 and sections 120, with sections 110 being wider than sections 120.

Each section 110 includes an aperture 116. Aperture 116 may include a generally T-shaped aperture. Sections 110 are separated by cutting out a generally U-shaped space 112.

Each section 120 includes a tab 126 arranged to lock with aperture 116. Tab 126 may include a generally T-shaped tab. Sections 120 are separated by cutting out a generally U-shaped space 122.

Cable manager 10 further includes ends 130 and 140 with apertures 132 and 142 for fasteners.

During installation, individual sections 110 are coupled to corresponding individual sections 120. Coupling may be made easier by establishing bend lines 134, 136, and 138.

The cable manager 10 of FIGS. 8-9 has more flexibility than the cable manager 10 of FIGS. 6-7. Bending is similar in the one direction that places flexible member 12 on the inside of the bend. Additional flexibility is provided by adding spaces 112 and 122 between adjacent cable retainers 18.

Although particular reference has been made to certain embodiments, variations and modifications are also envisioned within the spirit and scope of the following claims.

The invention claimed is:

1. A cable manager comprising:
a flexible sheet including
a support section for supporting multiple cables along a portion of a length of the cables, the support section including a first end and a second end, the support section adapted to assume shapes and twists when the cables bend, and the first end including a first aperture and the second end including a second aperture, the first and second ends adapted to receive fasteners to anchor the support section;
a first cable retainer section wider than the support section and adjacent the first end, the first cable retainer section including first retainer sides which interlock; and
a second cable retainer section wider than the support section and adjacent the second end, the second cable retainer section including second retainer sides which interlock, and the second cable retainer section being separate from the first cable retainer section, and wherein the first cable retainer section and the second cable retainer section are oriented perpendicular to the support section and wherein the first cable retainer section and the second cable retainer section when interlocked create loops around the multiple cables.

2. The cable manager of claim 1, wherein the flexible sheet further comprises:
a guard section wider than the support section.

3. The cable manager of claim 2, wherein the guard section is located between the first end and the first cable retainer section.

4. The cable manager of claim 1, wherein the first and second cable retainer sections have different lengths.

5. The cable manager of claim 1, wherein the flexible sheet further comprises a first end section at the first end which is wider than the support section.

6. The cable manager of claim 1, further comprising a third cable retainer between the first and second cable retainers.

7. The cable manager of claim 6, wherein the third cable retainer is separated from the first cable retainer by a first gap and separated from the second cable retainer by a second gap.

8. An electrical cable manager comprising:
an electrically insulative flexible sheet including
a support section for supporting electrical cables along a portion of a length of the electrical cable, the support section including a first end and a second end, the support section adapted to assume shapes and twists when the electrical cables bend, and the first end including a first aperture and the second end including a second aperture, the first and second ends adapted to receive fasteners to anchor the support section;
a first electrical cable retainer section wider than the support section and adjacent the first end, the first electrical cable retainer section including first retainer sides which interlock; and
a second electrical cable retainer section wider than the support section and adjacent the second end, the second electrical cable retainer section including second retainer sides which interlock, and the second electrical cable retainer section being separate from the first electrical cable retainer section and wherein the first cable retainer section and the second cable retainer section are oriented perpendicular to the support section and wherein the first cable retainer section and the second cable retainer section when interlocked create loops around the electrical cables.

9. The electrical cable manager of claim 8, wherein the electrically insulative flexible sheet is made of polypropylene.

10. The electrical cable manager of claim 8, wherein (i) the first end includes a first aperture for anchoring the support section at a first point, or (ii) the second end includes a second aperture for anchoring the support section at a second point, and wherein the electrically insulative flexible sheet controls movement of the electrical cables as the second point moves relative to the first point.

11. The electrical cable manager of claim 8, wherein (i) the first end includes a first aperture for anchoring the support section at a first point, or (ii) the second end includes a second aperture for anchoring the support section at a second point, and wherein the electrically insulative flexible sheet bends between the first point and the second point.

12. The electrical cable manager of claim 8, wherein (i) the first end includes a first aperture for anchoring the support section at a first point, or (ii) the second end includes a second aperture for anchoring the support section at a second point, and wherein the electrically insulative flexible sheet bends and twists between the first point and the second point.

13. An electrical cable manager comprising:
   an electrically insulative flexible sheet including
   a support section extending along a main longitudinal axis and for supporting electrical cables along a portion of a length of the electrical cables, the support section including a first end and a second end, the support section adapted to assume shapes and twists when the electrical cables bend, and the first end including a first aperture and the second end including a second aperture, the first and second ends adapted to receive fasteners to anchor the support section;
   a first electrical cable retainer section wider than the support section and adjacent the first end, the first electrical cable retainer section including first retainer sides which interlock and extend along a first longitudinal axis which is transverse to the main longitudinal axis of the support section; and
   a second electrical cable retainer section wider than the support section and adjacent the second end, the second electrical cable retainer section including second retainer sides which interlock and extend along a second longitudinal axis which is transverse to the main longitudinal axis of the support section, and the second electrical cable retainer section being separate from the first electrical cable retainer section and wherein the first electrical cable retainer section and the second electrical cable retainer section are oriented perpendicular to the support section and wherein the first electrical cable retainer section and the second electrical cable retainer section when interlocked create loops around the electrical cables.

14. The electrical cable manager of claim 13, wherein the first and second longitudinal axes are (i) parallel to each other, and (ii) perpendicular to the main longitudinal axis.

15. The electrical cable manager of claim 13, wherein the electrically insulative flexible sheet is made of polypropylene.

16. The electrical cable manager of claim 13, wherein (i) the first end includes a first aperture for anchoring the support section at a first point, or (ii) the second end includes a second aperture for anchoring the support section at a second point, or both.

17. The electrical cable manager of claim 16, wherein the electrically insulative flexible sheet controls movement of the electrical cables as the second point moves relative to the first point.

18. The electrical cable manager of claim 16, wherein the electrically insulative flexible sheet bends between the first point and the second point.

19. The electrical cable manager of claim 16, wherein the electrically insulative flexible sheet bends and twists between the first point and the second point.

* * * * *